(12) United States Patent
Krishnamoorthy

(10) Patent No.: US 11,490,646 B2
(45) Date of Patent: Nov. 8, 2022

(54) MACHINE AND METHOD FOR PEELING SKIN FROM UN-PEELED OBJECTS

(71) Applicant: NANOPIX INTEGRATED SOFTWARE SOLUTIONS PRIVATE LIMITED, Karnataka (IN)

(72) Inventor: Sasisekar Krishnamoorthy, Hubli (IN)

(73) Assignee: NANOPIX INTEGRATED SOFTWARE SOLUTIONS PRIVATE LIMITED, Karnataka (IN)

( * ) Notice: Subject to any disclaimer, the term of this patent is extended or adjusted under 35 U.S.C. 154(b) by 646 days.

(21) Appl. No.: 16/482,590

(22) PCT Filed: Feb. 1, 2018

(86) PCT No.: PCT/IN2018/050051
§ 371 (c)(1),
(2) Date: Jul. 31, 2019

(87) PCT Pub. No.: WO2018/142424
PCT Pub. Date: Aug. 9, 2018

(65) Prior Publication Data
US 2020/0008460 A1 Jan. 9, 2020

(30) Foreign Application Priority Data
Feb. 1, 2017 (IN) .............................. 201741003794

(51) Int. Cl.
*A23N 7/10* (2006.01)
*A23N 5/00* (2006.01)
(Continued)

(52) U.S. Cl.
CPC ............... *A23N 7/10* (2013.01); *A23N 5/008* (2013.01); *A23N 5/01* (2013.01); *A23N 5/08* (2013.01)

(58) Field of Classification Search
CPC . A23N 7/10; A23N 5/008; A23N 5/01; A23N 5/08
(Continued)

(56) References Cited

U.S. PATENT DOCUMENTS 3,602,282 A 8/1971 Hirahara
3,854,395 A 12/1974 Hirahara
(Continued)

FOREIGN PATENT DOCUMENTS

CN 202019710 U 11/2011
GB 592600 A 9/1947

OTHER PUBLICATIONS

International Search Report and Written Opinion issued in PCT/IN2018/050051, dated Jun. 29, 2018; ISA/US.

*Primary Examiner* — Brent T O'Hern
(74) *Attorney, Agent, or Firm* — Fish IP Law, LLP

(57) ABSTRACT

The present disclosure discloses a machine and a method for peeling skin from un-peeled objects that mainly includes at least one controller, an object: handling unit, an agitating: and heating unit and a peeling and separating unit. The agitating and heating unit includes an agitator and a heater. The agitator receives un-peeled objects and hot abrasive particles. During agitation, un-peeled objects and hot abrasive particles tumble with each other thereby loosing bond between skin and objects and provide objects with loosely bonded skin. The heater heats the abrasive particles and then permits, flow within the agitator by use of abrasive conveyor. Objects with loosely bonded skin are then provided in the peeling and separation unit for peeling and separating skin from un-peeled objects and provide peeled objects in a controlled manner.

8 Claims, 5 Drawing Sheets

(51) Int. Cl.
*A23N 5/01* (2006.01)
*A23N 5/08* (2006.01)

(58) Field of Classification Search
USPC .......................................................... 426/482
See application file for complete search history.

(56) References Cited

U.S. PATENT DOCUMENTS

| | | | |
|---|---|---|---|
| 3,873,743 A | | 3/1975 | Aepli et al. |
| 4,045,879 A | * | 9/1977 | Witte .................. C11B 1/04 |
| | | | 99/451 |
| 4,062,985 A | | 12/1977 | Amstad |
| 4,083,836 A | * | 4/1978 | Anjou ................. A23J 1/14 |
| | | | 530/377 |
| 4,132,162 A | | 1/1979 | Magnuson |
| 4,317,426 A | | 3/1982 | Wheten |
| 2005/0089613 A1 | | 4/2005 | Nair |
| 2010/0151094 A1 | | 6/2010 | Choudhury et al. |

\* cited by examiner

MACHINE AND METHOD FOR PEELING SKIN FROM UN-PEELED OBJECTS

CROSS REFERENCE TO RELATED APPLICATIONS

This application is a U.S. National Phase Application under 35 U.S.C. 371 of International Application No PCT/IN2018/050051 filed on Feb. 1, 2018, which claims the benefit of priority from Indian Patent Application No. 201741003794 filed Feb. 1, 2017. The entire disclosures of all of the above applications are incorporated herein by reference.

FIELD

The present disclosure generally relates to an automated electro-mechanical machine for de-husking/peeling skin from un-peeled objects and a method for de-husking/peeling skin from un-peeled objects.

BACKGROUND

Manual de-husking/peeling of husk, skin, peel or shell from objects like nuts or kernels of objects, such as cashew nut, hazelnut, is difficult, time-consuming and tiresome task. Also, manual de-husking/peeling requires skilled labor for carrying out de-husking/peeling after which the nuts and kernels are either graded, processed or packed. In absence of skilled labor, the de-husking/peeling and grading operations are delayed and hampered affecting processing's of objects thereby impacts on costs.

There are some prior art documents referring to de-husking/peeling on-peeled objects. U.S. Pat. No. 3,873,743 titled as "Method for peeling cashew nuts" in which un-peeled cashew nuts are immersed in an aqueous acid-surfactant solution to loosen the skin and, thereafter, washing the so-treated kernel. Further, the kernel is immersed in a decolorizing bath, polishing the kernel and then drying the kernel. However, such method may not provide efficient peeling results.

U.S. Pat. No. 4,317,426 titled as "Blow-off apparatus for articles within tumbling barrel" discloses an apparatus for subjecting articles to a forceful air stream while confined within a tumbling barrel having a perforated peripheral wall. However, for proper functioning there is requirement of gas-impervious barrel enclosure enclosing that adds on the cost for the apparatus. Also, there can only be heating of articles and articles are not agitated which may lead to inefficient output.

U.S. Pat. Pub. No. US20050089613 titled as "Edible testa-on (skin-on) cashew nuts and methods for preparing same" discloses a process for preparing edible testa-on cashews exposing shelled testa-on cashews to a solvent, removing inedible chemicals from the testa-on cashews, drying the testa-on cashews, wherein the chemicals removed are concentrated in the testa of the cashews. However, such process may take too long to peel the cashew thereby the overall process may get delayed.

U.S. Pat. Pub. No. 20100151094 titled as "Methods, apparatuses, and systems for the removal of peels from agricultural produce" discloses destroying a connection between the peel and the flesh using either of thermal processes, chemical processes or combination of thermal and chemical processes and exposing the peeled surface to a jet of air having sufficient kinetic energy to substantially separate the peel from the flesh. However, the destroying methods may not be able to completely destroy the peel from the flesh and it is likely that breakage may occur due to high kinetic energy and inefficient pre-treatment Chinese Utility model Pub. No. 202019710 titled as "Filbert shelling machine" discloses a shelling mechanism for de-shelling hazelnut. The shelling mechanism includes sand roller and a sand strip, the sand roller is driven by an angle belt wheel and the sand strip is fixed on a sand strip frame. A sand strip regulation mechanism is also arranged on the sand strip frame for regulating the distance between the sand strip and the sand roller. However, regulating the distance between the sand strip and the sand roller each time is a tiresome and difficult process and in case the distance is less than that of the hazelnut, the hazelnut may be subjected to break due to the excessive pressure exerted by the sand strip and the roller.

Hence, there is a need for a machine and a method for de-husking/peeling skin from un-peeled objects that alleviate aforementioned drawbacks.

SUMMARY

The present disclosure discloses a machine for peeling skin from un-peeled objects, in accordance with one embodiment of the present disclosure. The machine includes at least one controller, an object handling unit, an agitating and heating unit and a peeling and separation unit. The object handling unit receives and conveys un-peeled objects, wherein receiving and conveying un-peeled objects is controlled by the controller. The agitating and heating unit is used for agitating and heating un-peeled objects received from an inlet element. The agitating and heating unit agitates and heats un-peeled objects for loosening bond between peel and object and provides objects with loosely bonded peels being removed from an outlet element. The peeling and separation unit is used for peeling and separating skin from un-peeled objects and provide peeled objects, wherein peeling and separation is controlled by the controller. The agitating and heating unit includes an agitator and a heater. The agitator is actuated by an actuating device and has a plurality of perforations and includes an abrasive receiver and a closable opening. The perforations are of size smaller than size of dried un-peeled objects and greater than size of abrasive particles. The abrasive receiver provides heated abrasive particles within the agitator and a closable opening is controllably configurable to be in an open configuration for receiving un-peeled objects and releasing objects with loosely bonded peels and in a closed configuration enables the agitator to agitate upon direction of controller and in presence of abrasive particles such that un-peeled objects being transformed by heating into objects with loosely bonded skin. The abrasive particles during agitation of agitator configured to be thrown out of agitator leaving un-peeled objects, un-peeled objects released from the closable opening in open configuration upon direction of controller. The heater, simultaneously receives thrown out abrasive particles from the agitator and heat the abrasive particles at a pre-determined temperature upon direction of controller, wherein the controller is in communication with at least one sensor provided in vicinity of heater. The abrasive conveyor is used for conveying heated abrasive particles to the agitator upon direction of the controller.

In one embodiment, the machine includes a chemical treatment unit, a decolorization unit and a drier. The chemical treatment unit is used for chemically treating conveyed un-peeled objects and provide treated un-peeled objects, wherein treating of conveyed un-peeled object is controlled by the controller. The decolourization unit is used for decolorizing treated un-peeled objects and provide decolorized un-peeled objects, wherein decolorizing is controlled by the controller. The drier is used for drying, at a pre-determined temperature, gained moisture during chemical treatment and/or decolourization treatment of at least one of treated un-peeled objects and/or decolorized un-peeled objects and provide dried un-peeled objects with retained original moisture, wherein drying is controlled by the controller, wherein dried un-peeled objects are directed to agitating and heating unit.

The present disclosure also discloses a method for peeling/de-husking skin/cover/shell/husk from un-peeled/husked objects by a machine for peeling skin from un-peeled objects. The method includes providing at least one controller, receiving and conveying un-peeled objects by an object handling unit, wherein receiving and conveying un-peeled objects is controlled by the controller. Agitating and heating, in an agitating and heating unit, un-peeled objects received from an inlet element. The agitating and heating unit agitates and heats un-peeled objects for loosening bond between peel and objects and provides objects with loosely bonded peels. Peeling and separating, in a peeling and separating unit, skin from un-peeled objects and provide peeled objects, wherein the peeling and separation is controlled by the controller. The agitating and heating unit provides objects with loosely bonded skin upon direction of the controller by: filling an agitator with un-peeled objects through a closable opening in an open configuration being in communication with the inlet element;

closing the closable opening to achieve closed configuration;

filling the agitator with hot abrasive particles through an abrasive receiver provided on the agitator;

agitating, by an actuating device, the agitator such that un-peeled objects are agitated and heated thereby providing objects with loosely bonded skin;

agitating the agitator such that abrasive particles being thrown out through a plurality of perforations configured on agitator, wherein the perforations are of size smaller than size of un-peeled objects and greater than size of abrasive particles;

removing objects with loosely bonded skin from the closable opening in open configuration;

receiving, simultaneously, on a heater abrasive particles thrown out from the agitator to heat abrasive particles; and circulating heated abrasive particles by an abrasive conveyor to the agitator.

In one embodiment, the method includes the steps of:

treating chemically, in a chemical treatment unit, conveyed un-peeled objects and provide treated un-peeled objects, wherein treating of conveyed un-peeled object is controlled by the controller;

decolorizing, in a decolourization unit, treated un-peeled objects and provide decolorized un-peeled objects, wherein decolorizing is controlled by the controller; and drying at a pro-determined temperature, in a drier, gained moisture during chemical treatment and/or decolourization treatment of at least one of treated un-peeled objects and/or decolorized un-peeled objects and provide dried un-peeled objects with retained original moisture, wherein drying is controlled by the controller, wherein dried un-peeled objects are directed to the agitating and heating unit for agitating and heating dried un-peeled objects.

OBJECTS

Objects of the present disclosure are listed below:

The main object of the present disclosure is to provide a machine and method for peeling/de-husking objects that substantially completely peels skin from un-peeled objects to achieve nuts or kernels.

It is another object of the present disclosure to provide a machine and method for peeling/de-husking objects that substantially reduces breakage of nuts or kernels during de-husking.

It is still another object of the present disclosure to provide an automated machine for peeling/de-husking objects that substantially reduces need of skilled labor and peeling/de-husking time for peeling/de-husking objects.

It is yet another object of the present disclosure to provide an automated machine for peeling/de-husking skin of un-peeled/husked objects that is compact and thereby, at large extent, reduces the space for peeling skin of objects.

It is another object of the present disclosure to provide an automated machine and method for peeling/de-husking objects that may utilizes a pre-treatment processes to loosen the bond between skin and object for ease in peeling.

It is still another object of the present disclosure to provide an automated machine that agitates and heats un-peeled objects for loosing bond between the skin and the un-peeled object.

It is yet another object of the present disclosure to provide a method for peeling/de-husking skin from objects for completely peeling/de-husking objects.

BRIEF DESCRIPTION OF THE DRAWINGS

These and other objects, features, and advantages of the disclosure will best be understood from the following description of various embodiments thereof, selected for the purposes of illustration, and shown in the accompanying drawings.

DETAILED DESCRIPTION

Figure 1:
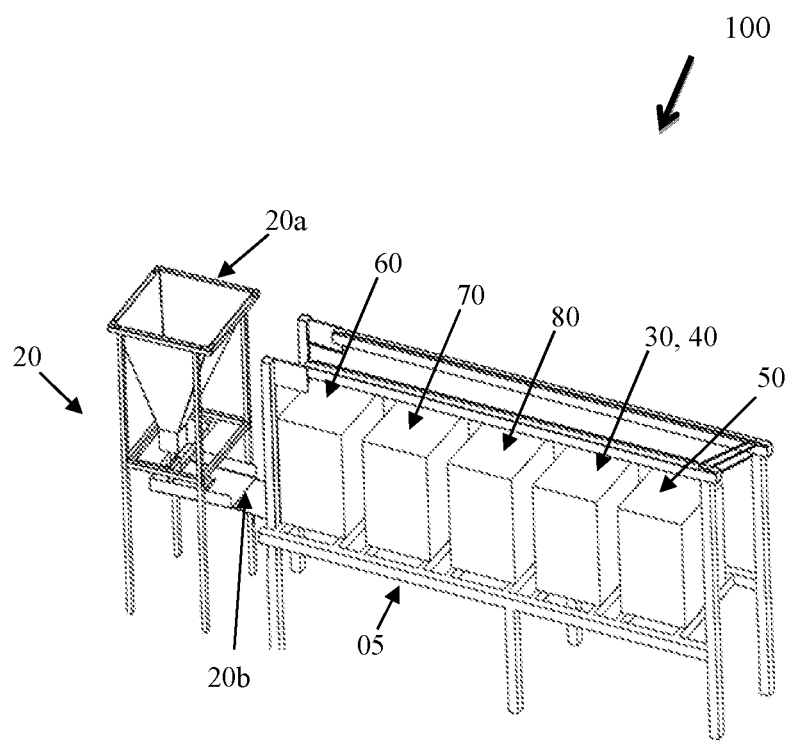
FIG. 1 is a schematic perspective view of a machine for peeling/de-husking un-peeled objects, in according to one embodiment of the present disclosure.

The present disclosure will now be described in detail with reference to the accompanying drawings. Now, refer in more detail to the exemplary drawings for the purposes of illustrating non-limiting embodiments of the present disclosure.

FIG. 1 to FIG. 4 illustrates a machine (100) for peeling/de-husking skin/cover/shell/husk from un-peeled/husked objects, in accordance with one embodiment of the present disclosure. In the present disclosure, words peeling, de-husking, un-peeling are alternatively used. Also, words skin/cover/shell/husk are alternatively used.

The machine (100) for peeling skin from un-peeled objects is disclosed. The main non-limiting components of the machine for peeling/de-husking are: at least one controller (10), an object handling unit (20), an agitating and heating unit (30 and 40) and a peeling and separation unit (50). However, when need arises the machine (100) can optionally comprise a chemical treatment unit (60), a decolourization unit (70), and a drier (80) fitted in sequence between the object handling unit (20) and the agitating and heating unit (30) and 40). A support frame (05) is provided to support the object handling unit (20), the agitating and heating unit (30 and 40), the peeling and separation unit (50), the chemical treatment unit (60), the decolourization unit (70), and the drier (80).

The object handling unit (20) receives un-peeled objects in the machine (100) and conveys un-peeled objects further in the machine (100). In one embodiment, the object handling unit (20) includes a hopper (20a) for receiving un-peeled objects and a conveyor (20b) for conveying un-peeled objects such as a bucket conveyor or other types of smart conveyor which will manage time gap and batch size of un-peeled objects moving between the object handling unit (20), the agitating and heating unit (30 and 40), the peeling and separation unit (50), the chemical treatment unit (60), the decolourization unit (70), and the drier (80). In another embodiment, the object handling unit (20) is only a hopper (20a) that transfers object due to gravity without the need of conveyor (20b).

The chemical treatment unit (60) is used for mixing the un-peeled objects with various chemicals to chemically treat un-peeled objects and provide treated un-peeled objects. The chemical treatment unit (60) has various treatment parameters, one or more types of chemicals for treatment, refilling/re-usage of chemicals, determine particular lot/batch size to treat un-peeled object at a particular time is controlled by the controller (10). Moreover, controller (10) provides pre-defined movement to uniformly spread chemicals all over un-peeled objects. Based on the processing time and lot size, the conveyor (20b) will transfer treated un-peeled objects from the chemical treatment unit (60) to the decolourisation unit (70).

The decolourization unit (70) is used for decolorizing treated un-peeled objects received from the chemical treatment unit (60) and provide decolorized un-peeled objects. As it is of utmost important to maintain the colour of treated un-peeled object because colour is an important factor determining value of object once peeled. The decolourization unit (70) is completely controlled by the controller (10). Moreover, the batch/lot size of requirement of the decolourization unit (70) is controlled by the controller (10). For instance, if there is difference in batch size of the chemical treatment unit (60) and the decolourization unit (70), the controller (10) appropriately direct desired batch size to move from the chemical treatment unit (60) and the decolourization unit (70).

The drier (80) is used for drying gained moisture during chemical treatment and/or decolourization treatment of at least one of treated un-peeled objects or decolorized un-peeled objects at a pre-determined/controlled temperature. The drier (80) provides dried un-peeled objects with retained original moisture to the agitating and heating unit (30, 40). The drier (80) is controlled by the controller (10) depending on the capacity of the drier (80).

The agitating and heating unit (30 and 40) includes an agitator (30) and a heater (40) that receives dried un-peeled objects from the drier (80) or receives un-peeled objects from the object handling unit (20) for agitating and heating. The agitator (30) is a chamber that has at least one closable opening (32). The closable opening (32) when open permits inflow and outflow of un-peeled objects therethrough and when closed enables agitation of un-peeled objects. The closable opening (32) can also be provided with perforations (30a) The agitator (30) has at least one abrasive receiver (34) through which hot abrasive particles (not illustrated in Figures) are received. In one embodiment, the abrasive particles size is between 2 mm to 4 mm. Typically, abrasive receiver (34) is an axial tube. The agitator (30) has a plurality of perforations (30a) through which abrasive particles are thrown out of agitator (30) during movement of agitator (30). Thus, the size of perforations (30a) should be greater than the size of abrasive particles and the size of perforations (30a) should be less than the size of un-peeled objects so that un-peeled objects do not come out of perforations (30a). The opening and closing of closable opening (32) for receiving controlled quantity of un-peeled objects and removing objects with loosely bonded skin, actuation and de-actuation of agitator (30) and insertion and removal of abrasive particles in the agitator (30) is controlled by the controller (10). Due to continuous agitation of the agitator (30), the un-peeled objects get uniformly heated from all the sides with the heated abrasive particles and after a desired time flow of abrasive particles in the agitator (30) are stopped and all the abrasive particles are removed during agitating. Once abrasive particles are removed, the outlet element (38) is opened to remove objects with loosely bonded skin. Once one lot of objects with loosely bonded skin are taken out from outlet element (38), another lot of objects are received by the agitator (30) through the inlet element (36).

Figure 2:
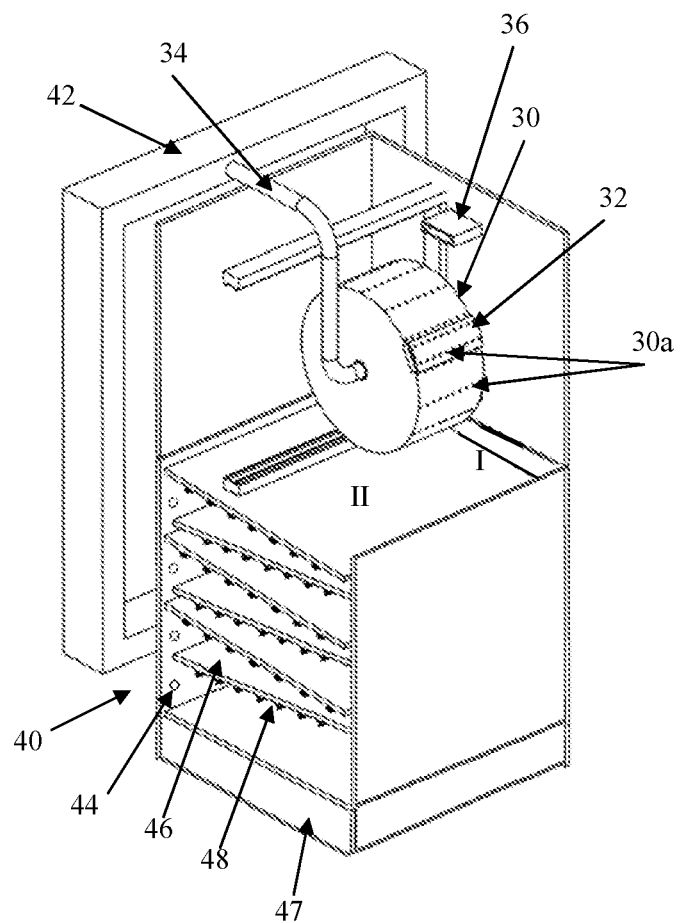
FIG. 2 is an internal perspective view of an agitating and heating unit of the machine of FIG. 1, wherein an agitator is in a first position.
Figure 3:
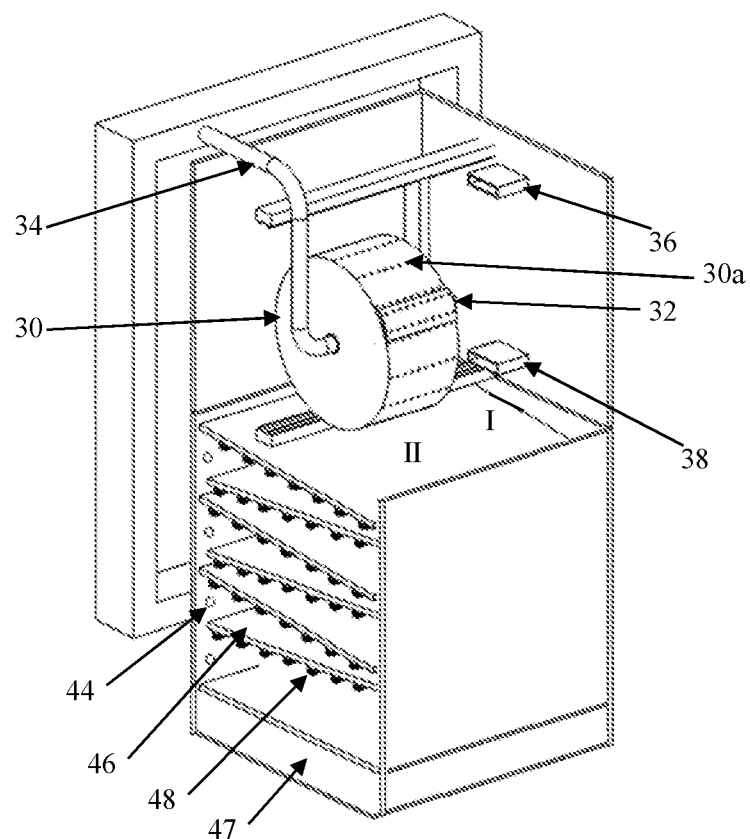
FIG. 3 is an internal perspective view of an agitating and heating unit of the machine of FIG. 1, wherein an agitator is in a second position.
Figure 4:
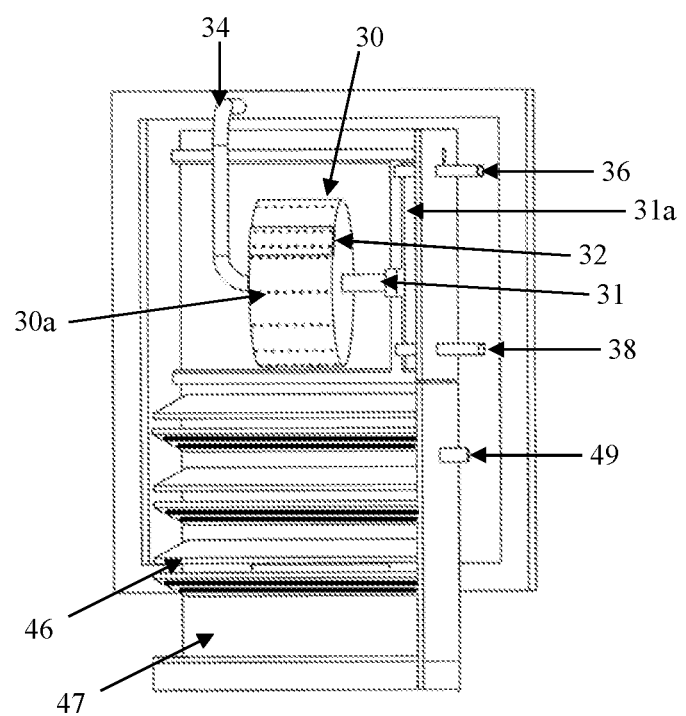
FIG. 4 is another perspective view of agitating and heating unit of the machine of FIG. 1.

In one embodiment, the agitator (30) is rotated at desired speed so that un-peeled objects therewithin is agitated. Also, agitator (30) can be provided with sliding motion and move in-between a first position (1) (as illustrated in FIG. 2) and a second position (11) (as illustrated in FIG. 3). When agitator (30) is sliding, abrasive receiver (34) can be extendable and retractable along with movement of agitator (30). In operation, when the agitator (30) is to be filled with un-peeled objects from the inlet element (36) then the agitator (30) is required to release objects with loosely bonded skin from the outlet element (38) then the agitator (30) is moved at respective inlet element (36) and the outlet element (38) located at the first position (1) and when the agitator (30) is agitated then the agitator (30) is moved to the second position (11). Position of agitator (30) at second position (11) prevents abrasive particles to fall on the inlet element (36) and the outlet element (38). The agitator (30) can also be provided with oscillating motion. The agitator (30) can have motions that can have combination of at least two of rotary motion, sliding motion and oscillatory motion. During motion, at a point all abrasive particles are emptied from agitator (30) leaving behind objects with loosely bonded skin which are removed through the outlet element (38). The actuating device (31) provides motion to the agitator (30). The actuating device (31) can also be moved along rails (31a).

In another embodiment, the inlet element (36) and the outlet element (38) are movable and the agitator (30) while agitating is stationary at one position and abrasive receiver can be stationary or moving and there is a defined distance between the agitator (30) and both of the inlet element (36) and the outlet element (38). Moreover, the inlet element (36) and the outlet element (38) are extendable and retractable and moves towards and away from the agitator (30). As the inlet element (36) and the outlet element (38) can be moved far from the agitator (30), during agitation, the abrasive particles are prevented to block the inlet element (36) and the outlet element (38).

The heater (40) receives abrasive particles that are thrown out from the agitator (30) during motion of the agitator (30). The heater (40) heats abrasive particles and the heated abrasive particles are transferred to the agitator (30) by an abrasive conveyor (42). The flow of abrasive particle can be continuous or intermittent and the flow of abrasive particles is controlled by the controller (10). The heater (40) is also controlled by the controller (10) upon inputs received from at least one sensor (44) provided in vicinity or in chamber of the heater (40). Moreover, the temperature of heater (40) is controlled by controller (10) based on real-time temperature or pre-fed temperature. Heating can be continuous, timer-controlled, intermittent or random.

In accordance with one embodiment, the heater (40) is a plurality of heating plates (46) hereinafter referred to as plates (46). Typically, the arrangement of plates (46) is each plate (46) is inclined such that inclination of adjacently disposed plate is in opposite direction such that a zig-zig arrangement is formed. Moreover, abrasive particles from first plate slides down (due to gravitation) to immediate below plate till a last plate to which the abrasive conveyor (42) is connected. A heater unit (48) like heating coils are positioned beneath the plates (46) that facilitate heating of abrasive particles. Alternatively, abrasive particles can be heated by use of hot blowers that blows hot air for heating abrasive particles. Further, at least one heat maintaining unit (49) is provided that blows green house gases (like $CO_2$ gases) for maintaining heat of abrasive particles and/or heater unit (48).

In accordance with one embodiment, a vibration unit (47) is provided that vibrates plates (46) such that it enhances flow of abrasive particles flowing down the plates (46). Further, due to vibrations abrasive particles gets uniformly heated. The vibration unit (47) is specifically useful when there is use of hot air in the heater unit (48) for uniform heating of abrasive particles by tossing abrasive particles on the plates (46). The vibration unit (47) can be integral or separate unit with respect to heater unit (48).

The peeling and separation unit (50) peels off and separates skin from un-peeled objects and provide peeled objects. In one embodiment, the peeling and separation unit (50) provides peeled objects and peels separately. The process of peeling and separation is controlled by the controller (10). Moreover, the controller (10) controls batch time and duration of peeling, separation and other like activities. In case of the objects are not efficiently peeled, such objects can be again directed to the heater (40).

The controller (10) controls variable batch size and variable batch time of each of the object handling unit (20), the chemical treatment unit (60), the decolourization unit (70), the drier (80), the agitating and heating unit (30, 40) and the peeling and separation unit (50) and thereby adjust same or variable input and output rates of each unit.

Figure 5:
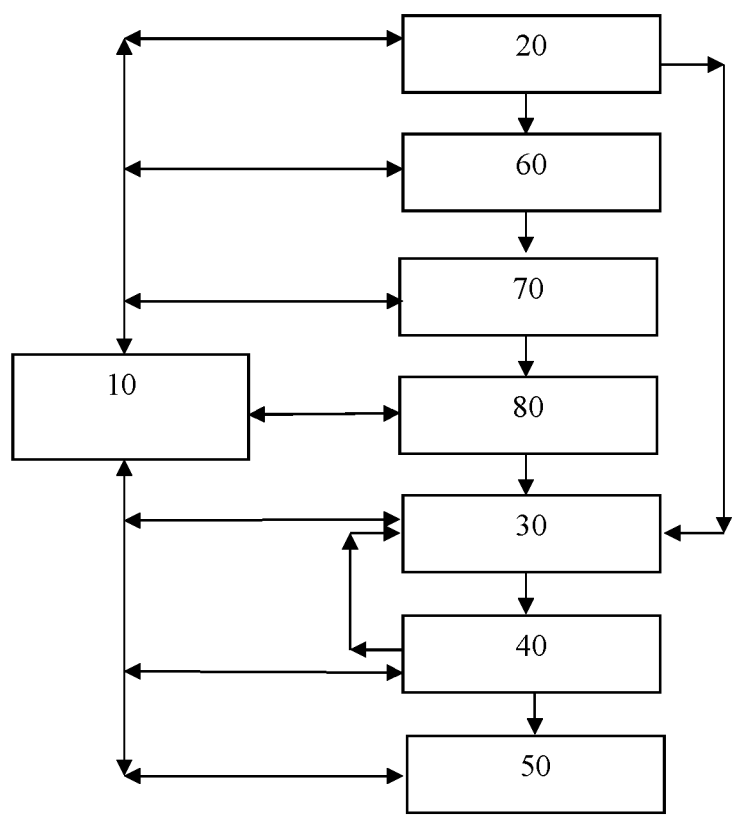
FIG. 5 is a flowchart depicting the method for peeling/de-husking objects by the machine of FIG. 1.

The present disclosure discloses a method for peeling/de-husking skin/cover/shell/husk from un-peeled/husked objects by the machine (100) for peeling skin from un-peeled objects. FIG. 5 is a flowchart depicting the preferred method for peeling/de-husking objects by the machine (100). Initially, un-peeled objects are introduced in the object handling unit (20) at a controlled rate controlled by the controller (10).

For cases where chemical treatment of un-peeled objects is required, the object handling unit (20) conveys un-peeled objects to the chemical treatment unit (60). Chemical treatment unit (60) chemically treats conveyed un-peeled objects by mixing of one or more chemical with conveyed un-peeled objects. After chemical treatment, chemical treatment unit (60) provides treated un-peeled objects.

Treated un-peeled objects are directed to the decolourization unit (70) wherein treated un-peeled objects are decolorized to gain its original colour. The decolourization unit (70) provides decolorized un-peeled objects. After decolourization, the decolorized un-peeled objects are received by the drier (80). Decolorized un-peeled objects have gained moisture during process of chemical treatment and/or decolourization. The drier (80) will dry gained moisture during the process of decolourization and/or chemical treatment and provide dried un-peeled objects with retained original moisture. The process of chemical treatment, decolourization and drying is controlled by the controller (10).

Dried un-peeled objects are then received towards the agitator (30) from the inlet element (36). Also, for cases where chemical treatment of un-peeled objects is not required, conveyed un-peeled objects are received in the agitator (30). The inlet element (36) thus receives either conveyed un-peeled objects or dried un-peeled objects after chemical treatment. The inlet element (36) is selective in communication with closable opening (i.e. the flap) of the agitator (30). Moreover, irrespective of the position of the agitator (30), when directed by the controller (10), the agitator (30) moves such that the closable opening (32) moves in vicinity of the inlet element (36) and the closable opening (32) gets opened. Conveyed un-peeled objects or dried un-peeled objects are transferred from the inlet element (36) to the communicable closable opening (32) and gets filled within the chamber of the agitator (30). Once desired/controlled quantity of conveyed un-peeled objects or dried un-peeled objects are filled, closable opening (32) is closed.

In the agitator (30), hot abrasive particles are also introduced, either intermittently or continuously, in the agitator (30) through the abrasive receiver (34). Abrasive receiver (34) can be moved (extendable and retractable) along with the agitator (30). When the agitator (30) is actuated by the actuating device (31), the hot abrasive particles are in contact with and are rubbed with conveyed un-peeled objects or dried un-peeled objects to loosen the bond between skin and un-peeled object and provide objects with loosely bonded skin. During agitation of agitator (30), abrasive particles are thrown out of the perforations (30a). At a particular time, all abrasive particles are emptied from the agitator (30) and only objects with loosely bonded skin are present within the agitator (30). The closable opening (i.e. the flap) (32) of the agitator (30) is positioned to be in communication with outlet element (38). Moreover, irrespective of the position of the agitator (30), when directed by the controller (10), the agitator (30) moves such that the closable opening (32) moves in vicinity of the outlet element (38) and the closable opening (32) gets opened to release objects with loosely bonded skin.

In one embodiment, the agitator (30) is configured for rotary motion and sliding motion between the first position (1) and the second position (11). At first position (1), the inlet element (36) and the outlet element (38) are provided for receiving conveyed/dried un-peeled objects and throwing out objects with loosely bonded skin. At second position (II), the agitator (30) is agitated so that when abrasive particles are thrown out through perforations (30a), the inlet element (36) and the outlet element (38) are prevented by being blocked because of abrasive particles.

In another embodiment, the inlet element (36) and the outlet element (38) are movable [retractable and extendable between the first position (1) and the second position (11)] and the agitator (30) is positioned at the second position (II) which is configured to be agitated at the second position (II) only and the abrasive receiver (34) is stationary or moving.

Abrasive particles when thrown out from the agitator (30) are received by the heater (40) which heats abrasive particles. In one embodiment, in the heater (40), abrasive particles travel in zig-zag pattern on plates (46) arranged in zig-zag pattern. The heater unit (48) provided below the plates (46) heats abrasive particles. Typically, vibrating unit (47) is provided that vibrates abrasive particles flowing of the plates (46) for enabling uniform heating and efficient flow of abrasive particles on the plates (46). Alternative heating arrangements like hot blowers/hot air blowers can also be provided for heating abrasive particles. Further, at least one heat maintaining unit (49) is provided that blows green house gases for maintaining heat of abrasive particles and/or heater unit (48).

Objects with loosely bonded skin are then introduced in the peeling and separation unit (50) that peels off and separates skin from un-peeled objects and provide peeled objects. In one embodiment, the peeling and separation unit (50) provides peeled objects and peels separately. The process of peeling and separation is controlled by the controller (10). Moreover, the controller (10) controls batch time and duration of peeling, separation and other like activities.

The controller (10) controls variable batch size and variable batch time of each of the object handling unit (20), the chemical treatment unit (60), the decolourization unit (70), the drier (80), the agitating and heating unit (30, 40) and the peeling and separation unit (50) and thereby adjust same or variable input and output rates of each unit.

In event when treatments/processes like chemical, de-colorization, drying, agitating and heating, and/or peeling and separation is/are not processed as desired, one or more of treatments/processes like chemical, de-colorization, drying, agitating and heating, and/or peeling and separating processes can be re-conducted in any sequence by reverse input to carry out the desired process. Also, treatments/ processes like chemical treatment, de-colorization, drying treatment, agitating and heating treatment and/or peeling and separation treatments/processes can be used for number of times in desired sequence to achieve desired result.

The machine (100) can be used for peeling various objects like cashew nuts, hazel nuts, almond or any other nuts with husk in conjunction with the chemical treatment unit (60), the decolourization unit (70) and the drier (80). The machine (100) can be used for peeling various objects like peanuts or any other nuts with husk without the usage of the chemical treatment unit (60), the decolourization unit (70) and the drier (80).

Thus, the machine (100) for peeling/de-husking skin from un-peeled objects that substantially completely de-husk nuts or kernels from objects by use of heat, abrasive particles, blower and dryer. The machine (100) for de-husking objects that substantially reduces breakage of nuts or kernels during de-husking. The automated machine (100) for peeling/de-husking objects substantially reduces need of skilled labor and de-husking time and space for peeling/de-husking objects. The method for peeling/de-husking skin from un-peeled objects is carried out efficiently by performing complete peeling/de-husking skin from un-peeled objects so as to provide desired peeled objects.

As will be readily apparent to those skilled in the art, the present disclosure may easily be produced in other specific forms without departing from its essential characteristics. The present embodiments is, therefore, to be, considered as merely illustrative and not restrictive, the scope of the disclosure being indicated by the claims rather than the foregoing description, and all changes which come within therefore intended to be embraced therein.

We claim:

1. A method for peeling skin from un-peeled objects by a machine for the peeling skin from the un-peeled objects, said method comprising:
   a. providing at least one controller;
   b. receiving and conveying the un-peeled objects by an object handling unit, wherein the receiving and the conveying the un-peeled objects is controlled by said at least one controller;
   c. agitating and heating, in an agitating and heating unit, the un-peeled objects received from an inlet element, said agitating and heating unit configured to agitate and heat the un-peeled objects for loosening bond between peel and object and provide heated un-peeled objects; and
   d. the peeling and separating, in a peeling and separation unit, the skin from the heated un-peeled objects and provide peeled objects, wherein the peeling and the separating is controlled by said at least one controller, wherein, said agitating and heating unit configured to provide the heated un-peeled objects upon direction of said at least one controller by:
      i. filling an agitator with the un-peeled objects through a closable opening in an open configuration being in communication with said inlet element;
      ii. closing said closable opening to achieve closed configuration;
      iii. filling said agitator with abrasive particles through an abrasive receiver provided on said agitator, wherein temperature of the abrasive particles is higher than temperature of the un-peeled objects;
      iv. agitating, by an actuating device, said agitator such that the un-peeled objects are agitated and heated thereby providing the heated un-peeled objects;
      v. agitating said agitator such that the abrasive particles being thrown out through a plurality of perforations configured on the agitator, wherein said perforations are of size smaller than size of the un-peeled objects and greater than size of the abrasive particles;
      vi. removing the heated un-peeled objects from said closable opening in an open configuration;
      vii. receiving, simultaneously, on a heater the abrasive particles thrown out from said agitator to heat the abrasive particles; and
      circulating the heated abrasive particles by an abrasive conveyor to said agitator.

2. The method according to claim 1, further comprising the steps of:
   a. treating chemically, in a chemical treatment unit, the conveyed un-peeled objects and provide treated un-peeled objects, wherein the treating of the conveyed un-peeled objects is controlled by said at least one controller;
   b. decolorizing, in a decolourization unit, the treated un-peeled objects and provide decolorized un-peeled objects, wherein the decolorizing is controlled by said at least one controller; and c. drying at a pre-determined temperature, in a drier, gained moisture during the chemical treatment and/or the decolourization treatment of the decolorized un-peeled objects and provide dried un-peeled objects with retained original moisture, wherein the drying is controlled by said at least one controller, wherein the dried un-peeled objects are directed to said agitating and heating unit for agitating and heating the dried un-peeled objects.

3. The method according to claim 2, wherein step of real-time controlling by said at least one controller of said object handling unit, said chemical treatment unit, said decolourization unit, said drier, said agitating and heating unit and said peeling and separation unit is controlled in variable batch size and variable batch time.

4. The method according to claim 1, wherein the agitating of said agitator is in a rotary motion, a sliding motion, oscillatory motion and/or a combination of at least two of rotary motion, sliding motion and oscillatory motion.

5. The method according to claim 1, moving:
said abrasive receiver to extend and retract with said agitator; or said inlet element and outlet element while the agitator being agitating at stationary/one position and said abrasive receiver is stationary or moving.

6. The method according to claim 1, wherein moving the abrasive particles on a plurality of plates which are arranged such that the abrasive particles slides down from a first plate to immediate below plate till a last plate and a heater unit positioned beneath said plurality of plates to heat the abrasive particles.

7. The method according to claim 6, wherein the heating by said heater unit is performed through at least one of a heating rod, a hot blower and/or by using of a heat maintaining unit with greenhouse gases.

8. The method according to claim 6, providing a vibration unit in said heater for vibrating said plurality of plates for permitting flow of the abrasive particles from one plate to another and enabling uniform heating of the abrasive particles.

\* \* \* \* \*